United States Patent [19]
Gonzalez et al.

[11] Patent Number: 5,479,376
[45] Date of Patent: Dec. 26, 1995

[54] METHOD FOR COMPENSATING SEISMIC WAVEFIELD AMPLITUDES FOR TRANSMISSION LOSSES IN THE OVERBURDEN

[75] Inventors: Alfonso Gonzalez, Sugar Land; Ronald E. Chambers, Houston, both of Tex.

[73] Assignee: Western Atlas International, Inc., Houston, Tex.

[21] Appl. No.: 114,558

[22] Filed: Aug. 30, 1993

[51] Int. Cl.$^6$ ............................ G01V 1/26; G01V 1/28
[52] U.S. Cl. ........................... 367/47; 367/68; 367/73; 364/421
[58] Field of Search ................. 367/45–47, 68, 367/73; 364/421

[56] References Cited

U.S. PATENT DOCUMENTS

| | | | |
|---|---|---|---|
| 4,312,050 | 1/1982 | Lucas | 367/44 |
| 4,866,679 | 9/1989 | Chambers | 367/47 |

FOREIGN PATENT DOCUMENTS 640847  3/1995  European Pat. Off. .

OTHER PUBLICATIONS

Gonzalez et al, 56th EAEG Mtg, Jun. 6, 1994, ISBN 90-73781-05-1, 2pp.
Gonzalez et al, 64th Anniv. SEG Int. Mtg, Oct. 23, 1994, pp. 1501–1504.
Taner, M. T., and Koehler, F., 1981, Surface Consistent Corrections: Geophysics, vol. 46, No. 1, pp. 17–22.
Chiburis, E. F., 1984, Analysis of Amplitude Versus Offset to Detect Gas/Oil Contacts in the Arabian Gulf: 54th Ann. Internat, Mtg., Soc. Expl. Geophy., Expanded Abstracts, 669–670.
Chiburis, E. F., 1987, Studies of Amplitude Versus Offset in Saudi Arabia: 57th Ann. Internat. Mtg., Soc. Expl. Geophys., Expanded Abstracts, 614–616.
Leggett, M., Goulty, N. R. and Kragh, J. E., Study of Traveltime and Amplitude of Time–Lapse Tomography Using Physical Model Data, Geophysical Prospecting, vol. 41, pp. 599–619.

*Primary Examiner*—Nelson Moskowitz
*Attorney, Agent, or Firm*—William A. Knox

[57] ABSTRACT

The relative amplitudes of seismic reflection data contains very useful information about the subsurface earth formations. Surface and subsurface-consistent amplitude processing identifies and corrects for the variability introduced by instrumentation and surface distortions. Dynamic amplitude decomposition, the subject of this disclosure, identifies and compensates for reflection amplitude fading due to subsurface transmission absorption media.

5 Claims, 5 Drawing Sheets

METHOD FOR COMPENSATING SEISMIC WAVEFIELD AMPLITUDES FOR TRANSMISSION LOSSES IN THE OVERBURDEN

BACKGROUND OF THE INVENTION

1. Field of the Invention

This invention is concerned with compensating the observed amplitudes of seismic events for the effects of transmission losses due to wavefield propagation through overburden anomalies. The purpose is to better study seismic amplitude variations as a function of lithologic structure.

2. Discussion Of Relevant Art

It has long been known that the amplitude of seismic waveforms reflected from subsurface earth layers are influenced, in part, by the lithology of those layers. The reflection amplitude depends upon the acoustic impedance of the lithologic interface. The acoustic impedance is a function of the velocity contrast between two rock layers. The velocity is a function of the elasticity and density of the rock, which quantities, in turn, are a function of certain other parameters such as the composition and fluid content of the rocks. One of the more successful seismic amplitude studies led to the discovery of the Bright Spot display wherein gas/liquid interfaces are defined.

There is a plethora of physical phenomena that affect the amplitude of seismic transient waveforms, many of which are known or can be estimated and many of which have yet to be discovered. To name a few such phenomena we have: Source strength and coupling, receiver sensitivity, instrumental imbalance, receiver coupling to the earth, array directivity, near-surface scattering and absorption, solid friction, reverberation, reflector rugosity, spherical spreading, focussing effects, source-to-receiver offset, random noise and microseisms. The amplitude level of deep reflections may be 100 dB or more down with respect to the level of the first-arriving impulses by reason of the cumulative transmission losses at depth.

Many of the effects listed can be controlled or at least closely estimated such as source strength and receiver sensitivity. Amplitude as a function of offset and the effects of spherical spreading can be calculated. Other problems such as source or receiver coupling, reverberation and the like, cannot always be measured. Random noise, which always plagues us, can sometimes be minimized by statistical methods. Many effects that presently cannot be quantified are simply ignored.

Taner et al, in *Surface consistent corrections*, Geophysics, v. 46, pp.17–22, teach a method that decomposes seismic amplitudes into source, receiver, geology and offset components. The components are used to compensate for distortions associated with sources and receivers and for amplitude distortions introduced by wave propagation in the near-surface weathering layer. The residual amplitudes are more representative of the propagation and reflectivity properties of the subsurface. The method is limited to compensation for near-surface effects.

Lateral changes in lithology, such as the presence of gas in an otherwise homogeneous sandstone layer, induce anomalous amplitude decay in zones beneath the gas anomaly. Ideally, it would be desirable to compensate for that anomaly but the deeper the anomaly, the less effectively surface consistent amplitude decomposition algorithms perform. E. F. Chiburis, in two papers: *Analysis of amplitude versus offset to detect gas/oil contacts in the Arabian Gulf*, SEG expanded abstracts, 1984, pp 669–670, and *Studies of amplitude versus offset in Saudi Arabia*, SEG expanded abstracts, 1987, pp 614–616, described a method that partially overcomes the above limitation as follows: Let the lateral variation of the relative amplitudes of two reasonably closely-spaced-in depth reflectors be tracked, one of which reflectors is barren and the other of which is a target horizon. The amplitude variation will have a common effect on both reflectors due to the overburden and a unique effect on one (the target) reflector associated with local lithology changes at that reflector. Thus, local effects can be isolated.

M. Leggett et al. published a paper in *Geophysical Prospecting* entitled Study of Traveltime and Amplitude Time-Lapse Tomography Using Physical Model Data, v. 41, pp. 599–619, 1993, discuss traveltime and amplitude tomography as applied to cross-well seismic studies. The authors employed laboratory models to simulate the effects of the progress of the water front in an oil-field water-flooding operation. They conclude that traveltime tomography provides a clear picture of the flood-zone geometry but amplitude tomography, which was afflicted by multipathing and diffraction effects, produced a blurred non-useful image. It is to be observed that that method was confined to a study of energy propagating along direct travel paths between adjacent wells rather than by reflected paths to subsurface formations.

In U.S. Pat. No. 4,866,679, issued Sep.12, 1989, assigned to the assignee of this invention and which is incorporated herein by reference, R. E. Chambers teaches a surface-consistent amplitude decomposition technique based on the assumption that $A_{ij}$, the amplitude of a reflection near the surface is given by $$A_{ij}(t)=S_i*R_j*G(t)_k*O_l*C_c*N, \qquad (1)$$

where $S_i$=source component at location i, $R_j$=receiver component at location j, $G_k$=geology/lithology component at midpoint index k, $O_l$=offset component at offset index l, $C_c$=recording channel component if separable from R, N=random noise component, t=travel time from source i to receiver j, and the asterisks denote multiplication. Equation (1) may be solved by taking logarithms of both sides and computing a matrix inversion using, for example, the Gauss-Seidel algorithm as explained in the '679 patent. The teachings of that patent are important because amplitude distortions due to anomalous noise bursts is accounted for by the noise term N.

That formulation is useful in estimating seismic wavefield transmission losses due to anomalies near the surface. Surface attenuation effects, of course, affect all of the reflected events seen on a seismic recording. In the absence of a surface attenuator, it is conceivable that an anomalous zone embedded in an intermediate-depth layer could introduce transmission losses to seismic energy arriving from a deeper target horizon. That circumstance could mask potential diagnostic amplitude variations in reflected wavefields from the deeper horizon.

There is a need for a generalized method for estimating transmission losses from anywhere within the overburden to include the cumulative effects of wavefield propagation through the earth taken as a whole. The method should be preferably not restricted to any given target zone and should require no a priori earth model.

SUMMARY OF THE INVENTION

This invention teaches a method for processing seismic data including the steps of introducing a seismic wavefield into the earth from a source location and receiving the wavefield at a receiver location offset from the source location. The received wavefield is formatted as a time scale recording which is conveniently divided into time windows having a preselected width. A transmission-loss compensation operator is applied to the data samples within each time window to correct for anomalous amplitude fading due to subsurface absorption zones along the wavefield ray paths.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

In this invention, we generalize on formulation (1) by estimating the wavefield propagation effects including attenuation losses due to spherical divergence and cumulative transmission losses. Spherical divergence can, of course be compensated. We broaden the lithology term G to include cumulative effects of wavefield propagation through the earth along a raypath P from the source S to a receiver R:

$$G_{ij}(t) = (1-T_k)\Pi_{m=P}T_m,$$

where m is some discrete element along raypath P and T is the transmission coefficient for that raypath element.

Equation (1) now becomes $$A_{ij} = S_i * R_j * O_i * C_c * N * (1-T_k)\Pi_{m=P}T_m. \quad (2)$$

The important difference between equation (1) and generalized equation (2) is the coupling of the lithology terms along the raypath P. Just as in surface consistent traveltime decomposition where the equations used are a simplification of diffraction traveltime tomography, surface consistent amplitude decomposition equation (1) is a simplification of the more general equation (2). In both cases, the simplification assumes that the respective velocity or amplitude anomalies are found only near the surface of the earth.

Equation (2) may be linearized by taking the natural log of both sides to yield $$\ln A_{ij} = \ln S_i + \ln R_j + \ln O_i + \ln C_c + \ln N + \ln(1-T_k) + \Sigma_{m=P}\ln T_m. \quad (3)$$

Equation (3) defines a system of simultaneous equations $$H\,m = a, \quad (4)$$

wherein the matrix H is a linear transmission compensation operator that defines the array geometry, the vector m contains the amplitude components and the vector a includes the actual observations from the seismic data. The unknowns in m may be solved for by use of any standard matrix inversion algorithm such the Gauss-Seidel iteration. Having evaluated the vector m, the data can be compensated for source and receiver effects and for transmission effects such as amplitude fading due to the passage of a wavefield through acoustic energy absorption zones within the overburden taken as a whole. Data that have been so compensated in accordance with this teaching contain amplitude variations that are more representative of local reflector properties and provide a better input for relative amplitude analyses of the reflected wavefields.

Transmission effects such as amplitude fading imposed upon reflected seismic wavefields may make their presence known as absorption shadow patterns in the data samples that lie at or beneath an anomalous zone. The amplitudes of data samples may be attenuated by as much as 60 dB or more within the shadow zone. The structure of a possible shadow zone will be illustrated by the synthetic example of FIGS. 1 and 2.

Figure 1:
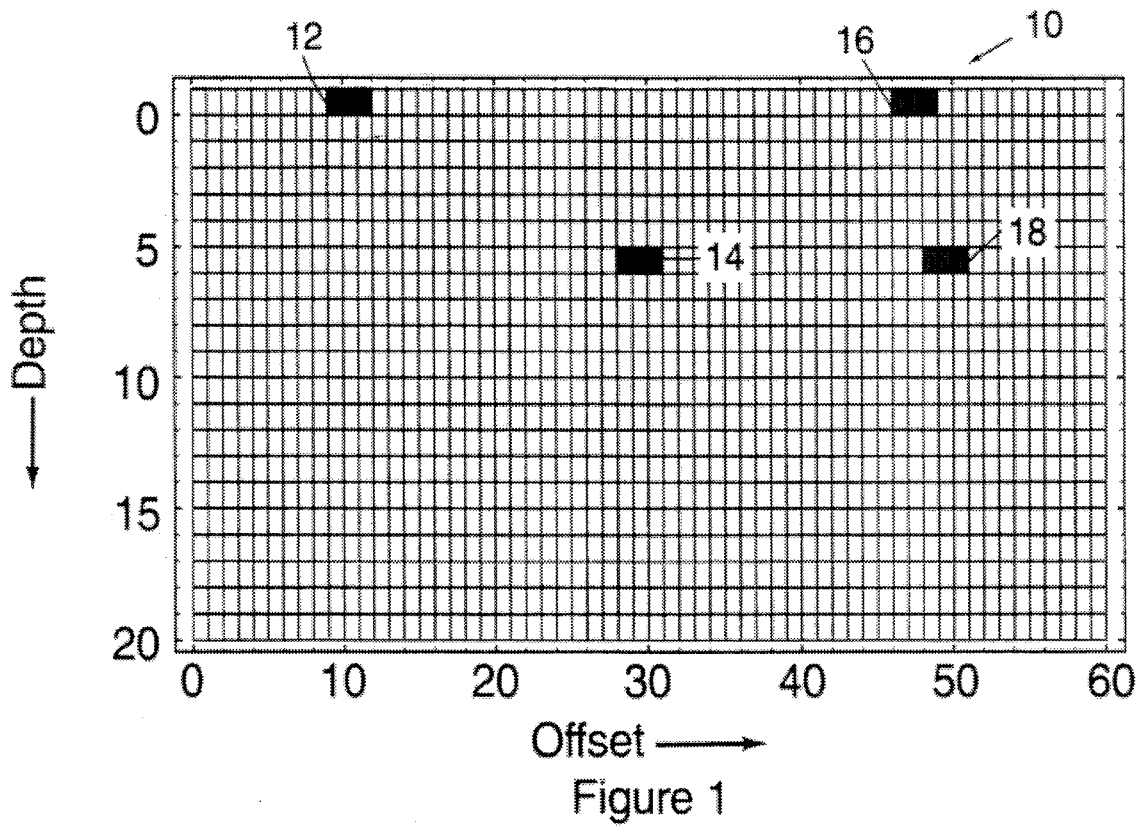
FIG. 1 is a discretized section of the earth showing four absorption anomalies in the overburden.

FIG. 1 represents a cross section of the earth that has been discretized into rows and columns of cells having arbitrary dimensions shown as a cell block 10. Any given cell is identified by the row number followed by the column number, the numbers being separated by a comma and enclosed in parentheses thus: (8,15). Two acoustic energy-absorption zones 12 and 14 in row −1 and two subsurface anomalies 16 and 18 in row 5 are shown. Each anomaly is three cells wide, one cell deep, the leftmost cell in each case occupying columns 9, 28, 46 and 48 respectively.

Figure 2:
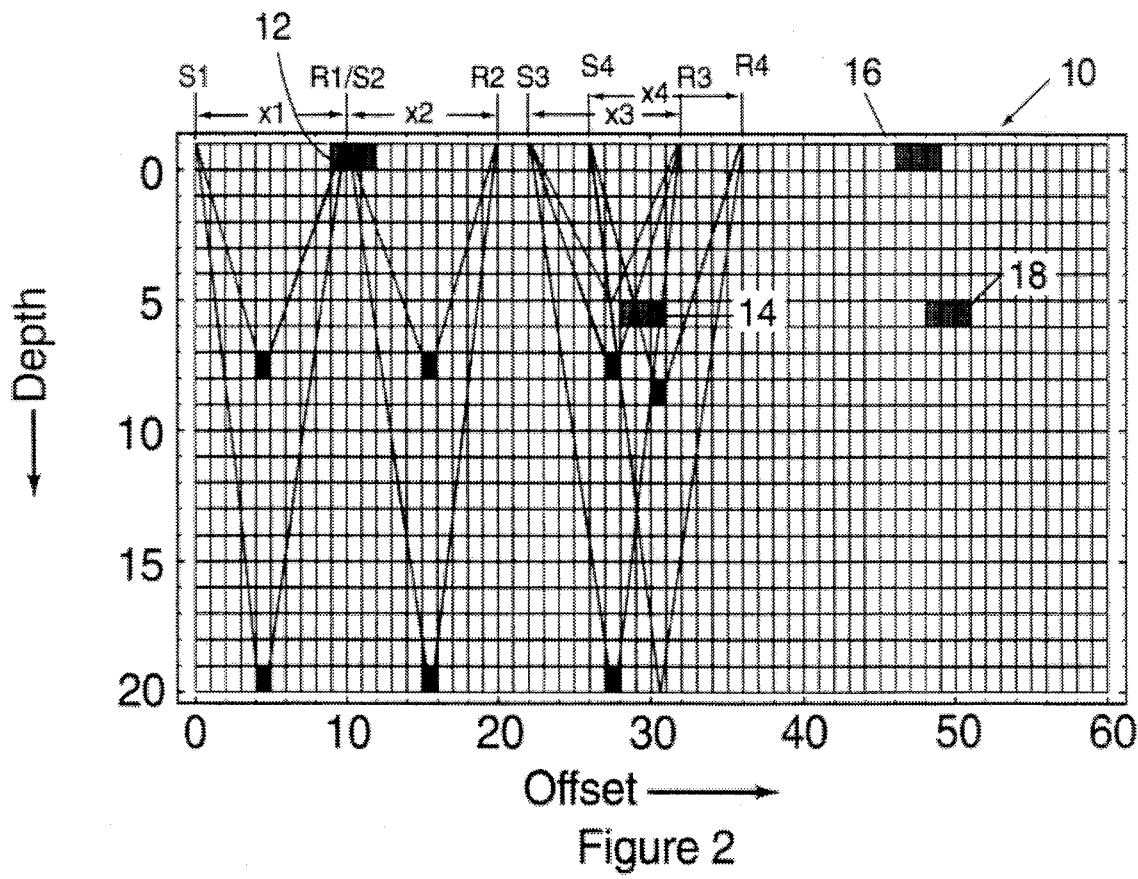
FIG. 2 illustrates various raypaths through the earth with respect to sources $S_i$ and receivers $R_j$.

FIG. 2 shows the configuration of the absorption zones of FIG. 1. At the top of the Figure, the surface locations of sources $S_i$, and receivers $R_j$, i=j=1, 2, 3, 4, . . . ,n, are shown, separated by an offset X having a length of 10 cell widths, hereinafter referred to as the spread length. Four spreads, X1–X4 are shown positioned at various places along cell block 10.

Consider now, a wavefield originating at source S1 and propagating along raypath S1-(19,4)-R1, passing through anomalous zone 12 just beneath R1. Because of wavefield transmission losses due to passage through the anomaly at (−1,9), an event reflected from midpoint (19,4) will be weaker than an event from the same level if spread X1 had been shifted to the left by one cell width. Cell (19,4) has been darkened to indicate a shadow region. Similarly, ray path S1-(7,4)-R1 would reveal a shadow region at midpoint (7,4) as shown by the darkened cell. When the spread is shifted to position X2, ray tracing will show similar shadow zones at cells (19,15) and (7,15). Further ray tracing will demonstrate that the single anomaly 12 creates twin-column shadow regions that extend through the entire section as shown in FIG. 3, at 20 and 22.

Buried absorption layers, such as gas/liquid contacts that produce so called Bright Spots generate a much different shadow pattern. Consider now, anomaly 14 at row 5, columns 28–30 with respect to spread X3. Ray paths S3-(19, 27)-R3 and S3-(7,27)-R3 pass through anomaly 14 and hence produce shadow regions as shown by the darkened cells at the respective midpoints (19,27) and (7,27). Raypath S3-(4,27)-R3 remains uncontaminated. With respect to spread S4, ray path S4-(8,30)-R4 will result in a shadow region at midpoint (8,30). However, raypath S4-(19,30)-R4 will not be obscured so that midpoint (19,30) which is directly beneath (8,30) will be clear. The shadow pattern exhibited by a buried anomaly such as 14 may have the form shown for 24 in FIG. 3.

Figure 3:
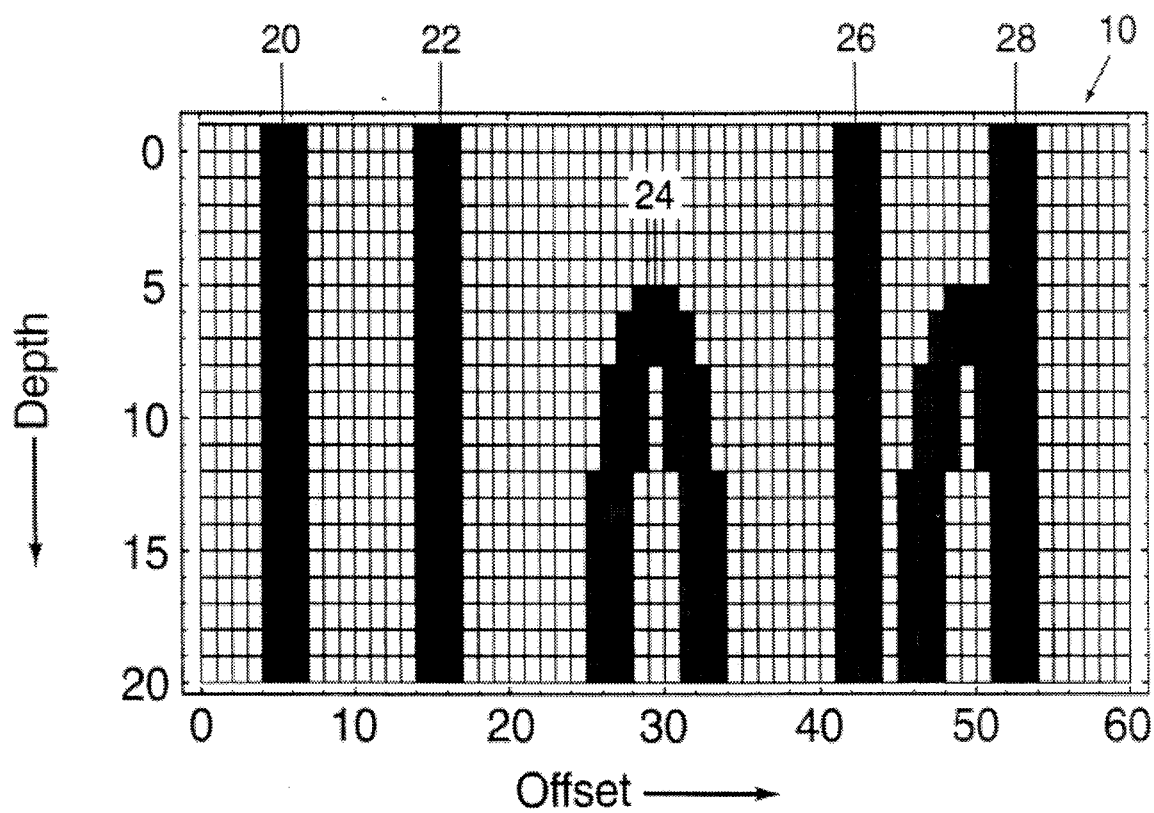
FIG. 3 shows the shadow patterns due to transmission loss of wavefield energy after passing through the anomalies of FIG. 1.

Anomalies 16 and 18, which partially overlap laterally but not vertically, will produce a combination of shadow patterns as shown at 26 and 28 of FIG. 3 as can be readily confirmed by ray tracing exercises similar to the previous analyses.

In operation, it is preferred to use substantially unprocessed seismic time-scale recordings. Digital format is assumed. The seismic data are demultiplexed, corrected for normal moveout and the very shallow data samples are muted. Muting is necessary to avoid introduction of direct or refracted arrivals to the reflected data samples. The data samples are divided into convenient time windows such as 0.100 to 0.200 second. The observed amplitudes represent the right hand side of equation (4). This linear system of equations is solved for m which is the absorption model estimated from the data. Once the model is found, ray tracing as described above is performed to generate the transmission losses for all the data. The compensation is done by applying the inverse transmission loss to the original unprocessed seismic data.

Figure 4:
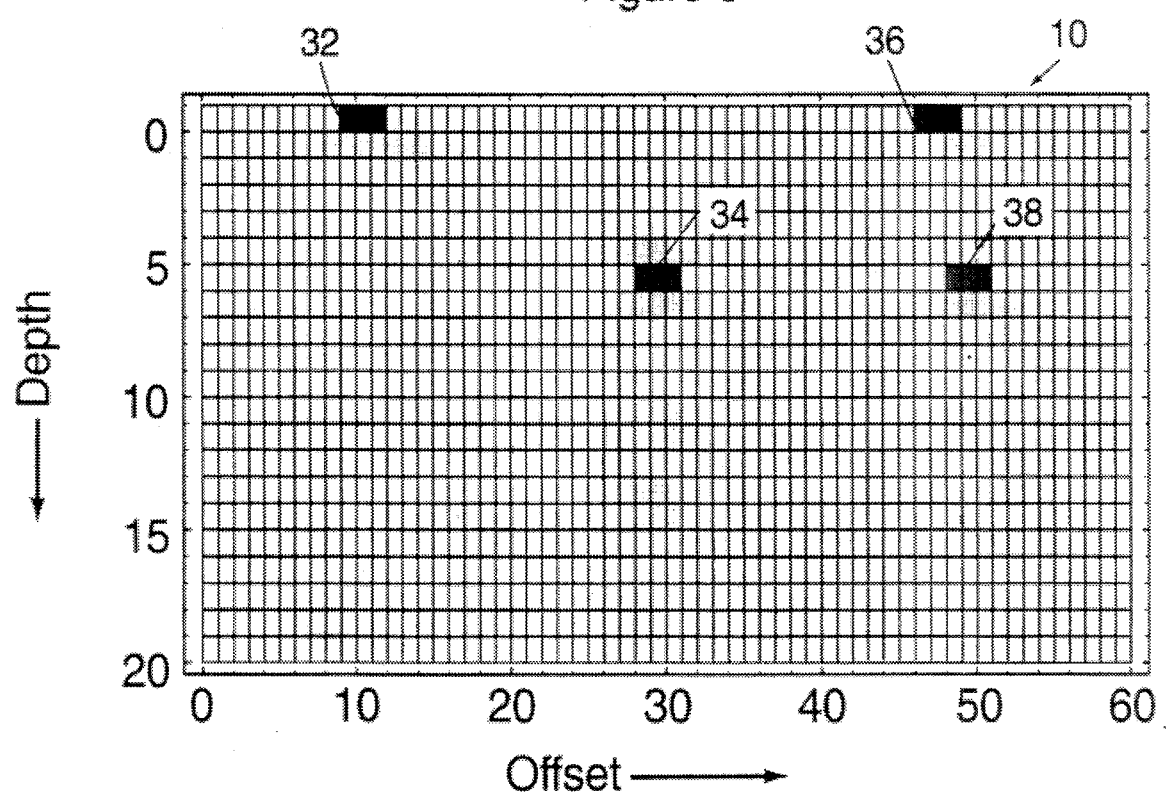
FIG. 4 is an exhibit of the results after processing in accordance with this invention showing the reconstructed absorption anomalies in the overburden.

FIG. 4 shows the results of processing FIG. 3 in accordance with this invention. It is to be observed that a very small amount of residual interference remains around anomalies 34 and 38 as well as 32 and 36 which correspond to the original anomalies 14 and 18, 12 and 16.

Figure 5:
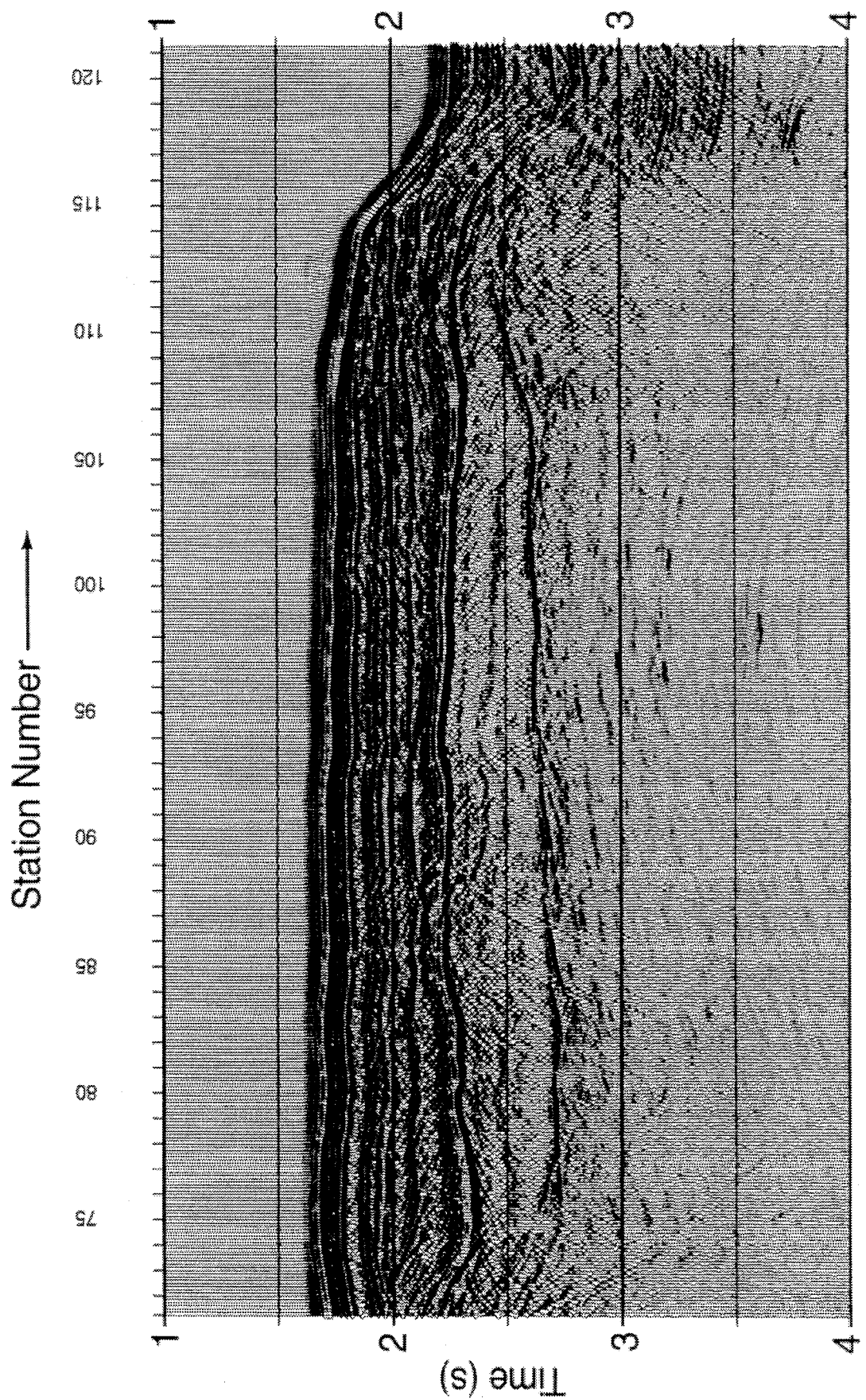
FIG. 5 is a raw seismic section unprocessed for absorption losses.

FIG. 5 is a seismic section recorded off the Gulf Coast in about 4300 feet of water. The sea floor reflection appears at about 1.2 seconds. The prominent reflection at about 2.3 seconds is the top of a salt lens. Beneath the bottom of the salt at about 2.75 seconds, the seismic data are sparse although a weakly-defined arch may be seen beneath stations 93–103 at a time of about 3.0 seconds.

Figure 6:
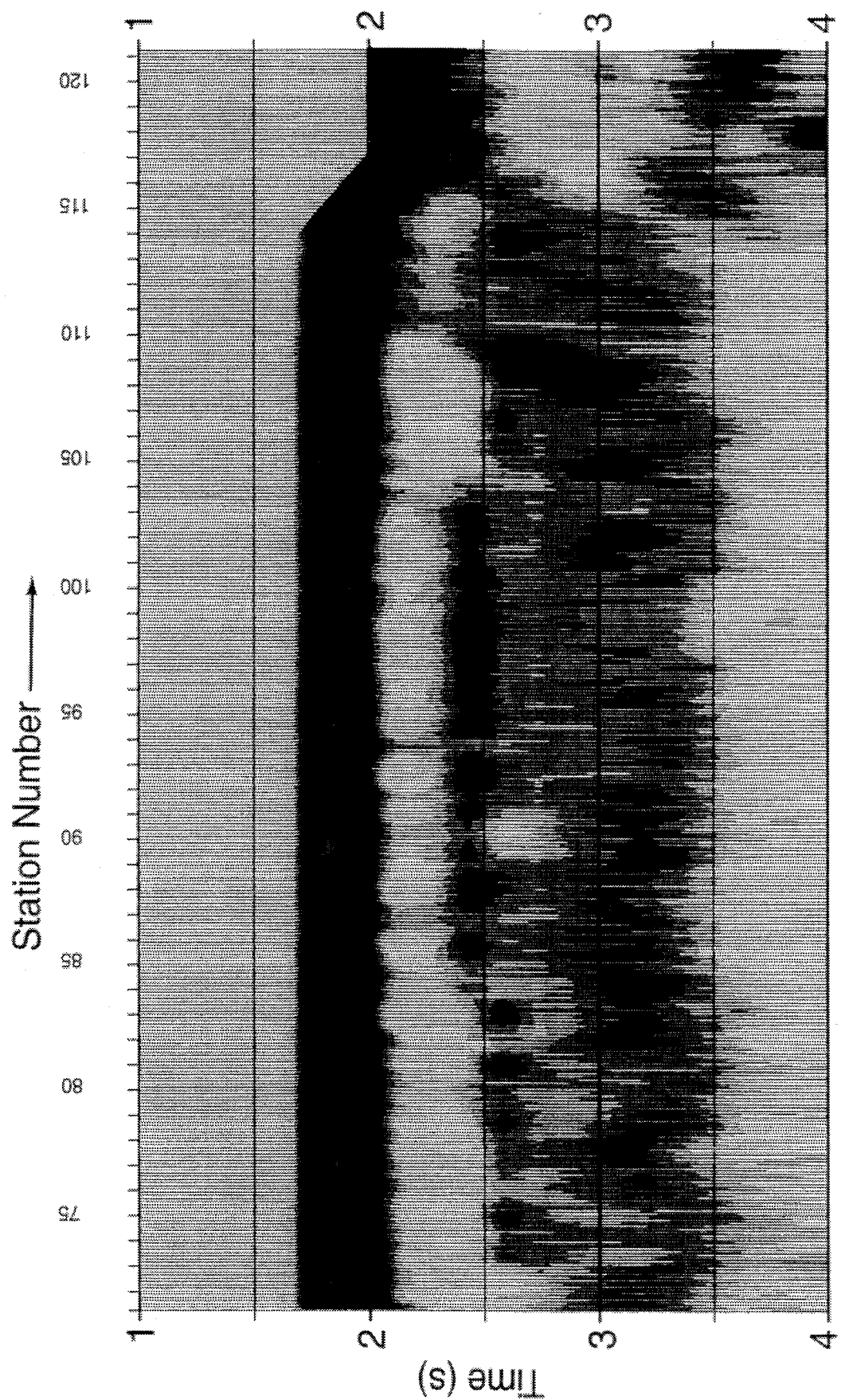
FIG. 6 is a display of the transmission absorption zones in the seismic section of FIG. 5.

FIG. 6 is a plot of the transmission coefficients derived from the seismic data using the teachings of this invention. Darker areas indicate regions of relatively greater absorption losses.

Figure 7:
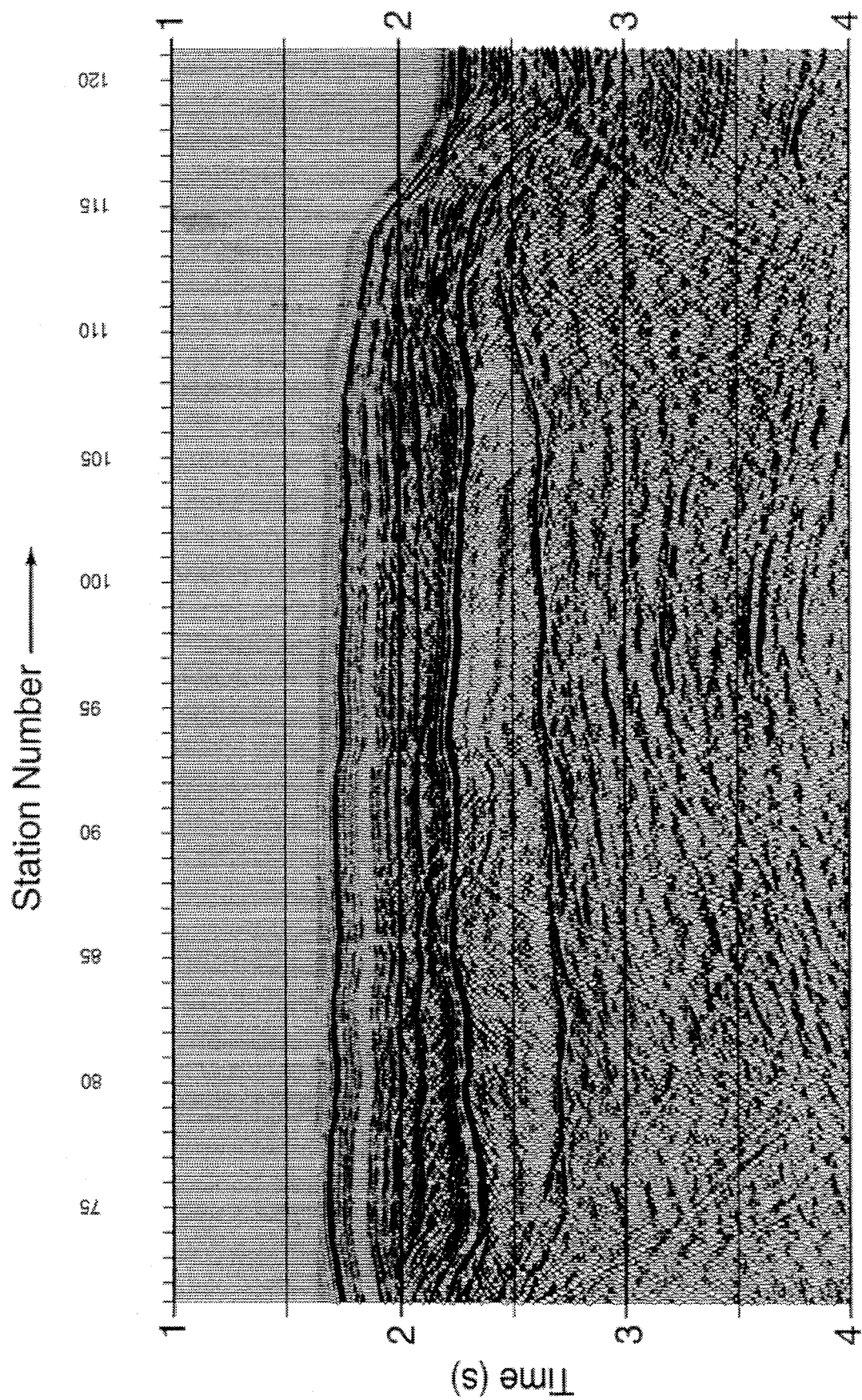
FIG. 7 is a display of the data of FIG. 5 after application of the transmission compensation operator.

FIG. 7 is a display of the seismic data after application of the transmission compensation operator as given by formulation (4). Observe the dramatic improvement in the resolution of the stratigraphy beneath stations 93–103 for reflection times between 3.0 and 4.0 seconds.

Anomalies such as bright spots sometimes produce noticeable diffraction patterns near the lateral edges of the gas trap. The diffraction patterns could be confused with transmission-loss shadow pattern. The two can be distinguished because the limbs of a diffraction hyperbola becomes asymptotic to the reciprocal of the formation velocity whereas the transmission-loss shadow pattern has a finite limiting width equal to the spread length.

The specific examples discussed herein are in no way limiting and are exemplary only. This invention is limited only by the appended claims.

What is claimed is:

1. A method for processing seismic data, comprising:

introducing a seismic wavefield into the earth at a source location;

at a receiving location offset from said source location, receiving said wavefield after reflection from subsurface earth layers and formatting said received wavefield as a time scale recording of data samples;

dividing said time scale recording into time windows of preselected width;

estimating a transmission loss map from the data; and compensating for anomalous amplitude fading by applying a transmission-loss compensation operator to the data samples within each said time window; displaying the compensated seismic data.

2. The method as defined by claim 1, comprising:

measuring the energy level of said wavefield within each said time window prior to the step of applying said transmission-loss operator.

3. The method as defined by claim 2, wherein said transmission-loss compensation operator is determined from the linear equation $$\ln A_{ij} = S_i + \ln R_j + \ln O_l + \ln C_c + \ln N + \ln (1-T_k) + \Sigma_{m=P} \ln T_m$$

where $A_{ij}$=reflection amplitude, $S_i$=source component at location i, $R_j$=receiver component at location j, $O_l$=offset component at offset l, $C_c$=channel component if separable from R, N=noise component, $T_m$=transmission coefficient for raypath element m, which defines a matrix H which is a linear transmission-loss compensation operator where H m=a, vector m contains the amplitude components and vector a includes the observations from the seismic data.

4. A method for compensating for amplitude fading of reflected seismic wavefield data samples in the presence of acoustic absorption anomalies in the overburden, comprising:

formatting said seismic wavefield data samples in time-sequential order;

subdividing the ordered data samples into time windows having a predetermined length;

estimating a transmission-loss map within each said time window from said seismic wavefield data; and applying a linear transmission-loss compensation operator to the sampled amplitude-levels of the data within each said time window; displaying the compensated seismic data.

5. The method as defined by claim 4 wherein:

said linear transmission loss operator is defined by the matrix

H m=a, where H is the transmissions-loss operator, m is a vector containing the amplitude components and the vector a includes the observations from the seismic data.

* * * * *